UNITED STATES PATENT OFFICE.

JOSEPH DARBY, OF CORTLANDVILLE, NEW YORK, ASSIGNOR TO HIMSELF AND STEPHEN BREWER, OF SAME PLACE.

IMPROVED ROOFING-CEMENT.

Specification forming part of Letters Patent No. 57,626, dated August 28, 1866.

*To all whom it may concern:*

Be it known that I, JOSEPH DARBY, of Cortlandville, in the county of Cortland and State of New York, have invented or discovered a new and useful Cement or Composition of Matter for Covering Roofs to Buildings and other Surfaces; and I do hereby declare that the following is a full and exact description thereof and of the ingredients of which it is composed.

I use the following-named ingredients in about the following proportions, by measure, to form my cement or composition, viz: one quart of ground plaster or gypsum, two quarts of sand, two quarts of water-lime, two quarts of coal-tar. I heat the coal-tar to the boiling-point, then thoroughly mix the aforesaid ingredients.

I apply the mixture or composition to the roof while warm with a trowel or stiff brush or broom. It adheres firmly to the roof, and is impervious to water, and, as it cools, hardens in a few days just sufficiently to be in a condition not to be injuriously affected by heat or cold or extreme changes of temperature.

My experience has convinced me that said composition is more durable and economical for such purposes than any other now in use.

In making my composition or cement I do not boil the coal-tar down at all, but, as before stated, simply bring it to the boiling-point, then thoroughly mix the ingredients, and the composition is fit for immediate use.

My cement or composition differs from all others with which I am acquainted in the following particulars, viz: The various cements now in use are made by boiling down the coal-tar from one-third to one-half, causing the cement thus formed to be hard and brittle and of very questionable utility, even upon felt roofing, but utterly ineffectual to form a good and durable roof when applied to bare boards or old and impaired shingle roofs.

Experience has satisfied me that my composition can be used successfully upon roofs made of ordinary rough boards matched or battened, and is of great value by reason of its adaptation to the repairing of old and impaired shingle roofs, to which I have applied my invention with complete and unvarying success. When thus applied it is impervious to water, and remains elastic and adhesive, and completely resists the inimical effects of heat and cold, the changes of temperature, and the expansion and contraction of the wood upon which it rests. Again, my cement is more economical, on account of the tar not being boiled down or evaporated, and is also more durable, because, with the tar in this last-mentioned condition, much more of the mineral ingredients can be incorporated therewith, as will be apparent when it is remembered that I use five parts of mineral to two of tar.

What I claim as my invention or discovery, and desire to secure by Letters Patent, is—

An elastic cement or composition of matter composed of the aforesaid herein-named ingredients, as and for the purposes herein set forth and described.

JOSEPH DARBY.

Witnesses:
WM. W. WINTER,
D. C. McGRAW.